(12) United States Patent
Nakano

(10) Patent No.: US 6,523,832 B1
(45) Date of Patent: Feb. 25, 2003

(54) SLIDE RING SEAL

(75) Inventor: Kenji Nakano, Weinheim (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/540,696

(22) Filed: Mar. 31, 2000

(30) Foreign Application Priority Data

Apr. 1, 1999 (DE) .......................... 199 14 929

(51) Int. Cl.[7] .............................. F16J 15/36
(52) U.S. Cl. .................. 277/370; 277/390; 277/393
(58) Field of Search ....................... 277/358, 370, 277/377, 379, 361, 362, 385, 389, 393, 397, 390, 391, 392

(56) References Cited

U.S. PATENT DOCUMENTS

| | | | | |
|---|---|---|---|---|
| 2,445,207 A | * | 7/1948 | Caserta |
| 2,559,963 A | * | 7/1951 | Jensen |
| 3,712,765 A | * | 1/1973 | Smith |
| 4,586,719 A | * | 5/1986 | Marsi et al. |
| 4,779,876 A | * | 10/1988 | Novosad |
| 5,114,163 A | * | 5/1992 | Radosav et al. |
| 5,123,660 A | * | 6/1992 | Dahlheimer et al. |
| 5,199,720 A | * | 4/1993 | Radosav et al. |
| 5,716,054 A | * | 2/1998 | Duffee et al. |
| 5,797,602 A | * | 8/1998 | Less |
| 5,961,122 A | * | 10/1999 | Marsi |

FOREIGN PATENT DOCUMENTS

DE 196 37 813 4/1998

* cited by examiner

Primary Examiner—Anthony Knight
Assistant Examiner—Vishal Patel
(74) Attorney, Agent, or Firm—Kenyon & Kenyon

(57) ABSTRACT

A slide ring seal, including a slide ring and a counter-ring. The slide ring and the counter-ring sealingly contact each other at sealing surfaces so as to be relatively twistable and acted upon by spring tension under axial prestressing. The slide ring, via a first sealing ring, is sealingly connected to a first drive ring in a rotatably fixed manner and/or the counter-ring, via a second sealing ring is sealingly connected to a second drive ring in a rotatably fixed manner. The first sealing ring and/or the second sealing ring, on the side of a flange of the respective drive ring facing the medium to be sealed off, is essentially completely overlapped.

4 Claims, 1 Drawing Sheet

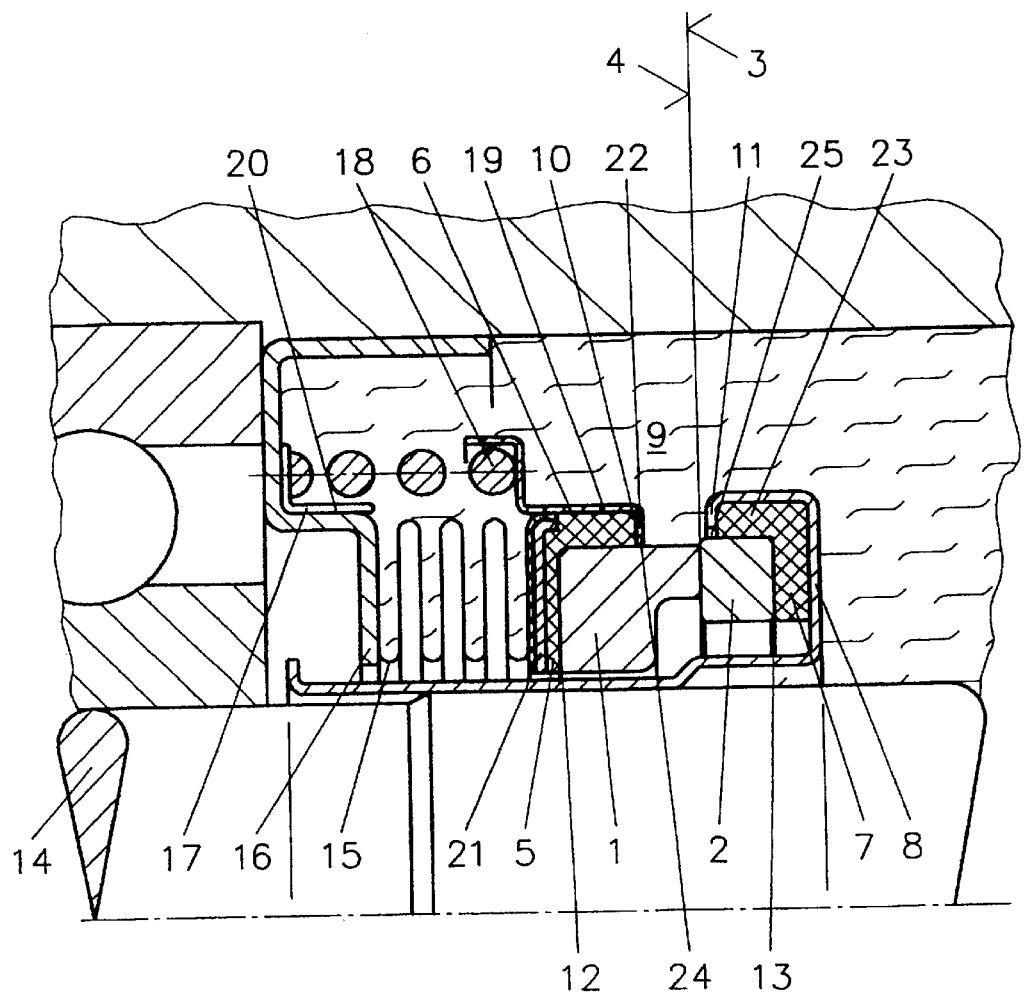

SLIDE RING SEAL

BACKGROUND OF THE INVENTION

The invention relates to a slide ring seal, including a slide ring and a counter-ring, the slide ring and the counter-ring sealingly contacting each other at sealing surfaces so as to be relatively twistable and acted upon by spring tension under axial prestressing, the slide ring, via a first sealing ring, being sealingly connected in a rotatably fixed manner to a first drive ring and/or the counter-ring, via a second sealing ring, being sealingly connected in a rotatably fixed manner to a second drive ring.

A slide ring seal of this type is known from German Patent 196 37 813 A1. The sealing rings disclosed there each have free surfaces that are impinged upon by the medium to be sealed off.

SUMMARY OF THE INVENTION

The invention is directed to the objective of refining a slide ring seal of the type cited above, such that, during normal use of the slide ring seal, a swelling of the sealing rings and a resulting spreading of the free surfaces of the sealing rings is substantially prevented or is reduced to a minimum. Consequently, and generally irrespective of the medium to be sealed off, an invariably rotatably fixed coordination of slide ring and counter-ring with respect to the respective drive ring is assured for a long service life.

To achieve the objective, provision is made that the first and/or the second sealing ring, on the side facing the medium to be sealed off, is essentially completely overlapped by a flange of the respective drive ring. The specific flange preferably contacts the surface of the respective sealing ring, touching it lightly. The coordination of the flange and the surface of the sealing ring, at a very small distance from each other, is also possible. In the configuration according to the invention, it is advantageous that the first and/or second sealing ring have virtually no free surfaces which come in contact with the medium to be sealed off. A swelling of the material of the sealing rings is therefore reduced to a minimum. In any case, as a result of the configuration according to the invention, the following are to be reliably avoided: a reduction in the prestressing of the sealing rings between the slide ring and the first drive ring and/or between the counter-ring and the second drive ring due to a swelling of the respective sealing rings; a spreading of the free surfaces; and the resulting danger that the slide ring and/or the counter-ring will twist with respect to the respective sealing ring. The rotatably fixed coordination of slide ring and/or counter-ring to the respective drive ring is therefore always dependably assured, irrespective of the medium to be sealed off.

The sealing rings are made of an incompressible material. As a result of the fact that the material of the sealing rings cannot spread due to the flange, a slight swelling of the sealing rings causes an intensified elastic prestressing between the slide ring and the first drive ring and/or between the counter-ring and the second drive ring.

The first and/or second sealing ring is preferably made of a polymer material, for example FKM (fluoropolymerizate). The slide ring and/or the counter-ring are usually made of a brittle material such as carbon or silicon carbide, and they are enclosed, at a radial distance, by the corresponding drive rings, which are preferably made of a rust-free metallic material. The respective sealing rings are arranged inside the gap formed by the distance. Undesirably high mechanical stresses, reducing service life, exerted on the slide ring and/or the counter-ring by the corresponding drive rings, are avoided as a result of the sealing rings.

The first sealing ring can be provided with an armoring reinforcement, which is entirely enclosed by polymer material. The armoring is mostly made of steel and is protected by the complete casing, for example from corrosion by the medium to be sealed off. The armoring brings about a greater stiffness of the first sealing ring and, as a result, an improved sealing between the spaces to be sealed off from each other.

The first and/or the second sealing rings have end faces, facing each other, which on the side facing the medium to be sealed off sealingly contact the respective flange of the drive ring, under elastic prestressing. In this context, it is advantageous that a volume increase of the sealing rings, upon impingement by the medium to be sealed off, is prevented. An impingement of the sealing rings by the medium to be sealed off brings about an increasing prestressing on the slide ring and/or the counter-ring, as a result of the sealing rings being clamped in the drive rings.

BRIEF DESCRIPTION OF THE DRAWING

One exemplary embodiment of a slide ring seal constructed according to the present invention is explained in greater detail below on the basis of the embodiment schematically shown in the FIGURE.

DETAILED DESCRIPTION OF THE INVENTION

The seal is essentially composed of a slide ring 1 made of carbon, which at its planar sealing surface 3 is elastically and sealingly supported, under axial prestressing, on planar sealing surface 4 of counter-ring 2, which is made of silicon carbide.

Both slide ring 1 as well as counter-ring 2, at their exterior peripheral sides and in the area of their end faces 12, 13 facing away from each other, are enclosed by a respective angular sealing ring 5, 7. Both sealing rings 5, 7 are configured so as to be a common material and, in this exemplary embodiment, are made of FKM.

The metallic components of the slide ring seal in this exemplary embodiment are each made of high-grade steel and are resistant to medium 9 being sealed off.

Counter-ring 2, second sealing ring 7, and second drive ring 8 constitute a preassemblable unit, which is connected in a rotatably fixed manner to shaft 14 to be sealed off.

Slide ring 1, first sealing ring 5, and first drive ring 6 are also coordinated with each other so as to be rotatably fixed. Also bellows 15, which in this exemplary embodiment is made of high-grade steel, housing 16, as well as support ring 17 and pressure spring 18 are arranged so as to be rotatably fixed with respect to slide ring 1.

Pressure spring 18 and bellows 15 are coordinated with each other, in terms of technical function, in a parallel circuit, and they effect an elastic pressure against sealing surfaces 3 and 4 from slide ring 1 and counter-ring 2 in the axial direction.

First end face 19 of bellows 15 is coordinated with slide ring 1, and second end face 20 of bellows 15 is coordinated with housing 16, without adhering, and, in this exemplary embodiment, exclusively in a frictionally locking manner. As a result of the fact that end faces 19, 20 of bellows 15 are fixed exclusively by clamping, both assembly as well as disassembly of the slide ring seal are significantly simplified.

End faces 22, 23, facing each other, of both sealing rings 5, 7 are essentially completely overlapped and contacted by flanges 10, 11, flanges 10, 11 being configured in each case as a radial flange. On the interior peripheral side, flanges 10, 11 encloses slide ring 1 and counter-ring 2 at a radial distance, so that damage to the impact-sensitive materials of slide ring 1 and counter-ring 2 during the normal use of the slide ring seal is excluded.

Both sealing rings 5, 7 can be impinged upon by medium 9 to be sealed off only through gaps 24, 25 formed by the intervening distance. If the impingement of the polymer materials, of which sealing rings 5, 7 are made, brings about a swelling of sealing rings 5, 7, then the radial prestressing between slide ring 1 and first drive ring 6, as well as between counter-ring 2 and second drive ring 8, is increased, since the respective volume of the installation spaces of first and of second sealing ring 5, 7 is essentially constant, and sealing rings 5, 7 are not able to expand spatially.

The first sealing ring, on the side of a front bellows wall of bellows 15 facing away from end face 12, is overlapped and, as a result, is not contacted by the medium to be sealed off.

What is claimed is:

1. A slide ring seal, comprising:
   a slide ring; and
   a counter-ring, the slide ring and the counter-ring sealingly contacting each other at sealing surfaces so as to be relatively twistable and each being acted upon by spring tension under axial prestressing, an exterior portion of the slide ring and an exterior portion of the counter-ring in a vicinity of the sealing surfaces contacting and sealing off a medium chosen to be sealed off from an interior portion of the slide ring and an interior portion of the counter-ring, the slide ring, via a first sealing ring, being sealingly connected to a first drive ring in a rotatably fixed manner, and the counter-ring, via a second sealing ring, being sealingly connected to a second drive ring in a rotatably fixed manner;
   wherein the first sealing ring and the second sealing ring, on a side of a flange of the respective drive ring facing the medium to be sealed off, are essentially completely overlapped by the flange, and wherein the first and second sealing rings have L-shaped cross-section.

2. The slide ring seal as recited in claim 1, wherein at least one of the sealing rings is made of a polymer material.

3. The slide ring seal as recited in claim 1, wherein at least one of the drive rings is made of a metallic material.

4. The slide ring seal as recited in claim 1, wherein at least one of the first and second sealing rings, on a side facing the medium to be sealed off, have end faces that face each other, the end faces sealingly contacting the respective flange of the drive ring under elastic prestressing.

* * * * *